US012612957B1

(12) United States Patent

Nejah

(10) Patent No.: US 12,612,957 B1

(45) Date of Patent: Apr. 28, 2026

(54) SEGMENTED GEAR SYNCHRONIZATION SYSTEM

(71) Applicant: Allen E. Nejah, San Jose, CA (US)

(72) Inventor: Allen E. Nejah, San Jose, CA (US)

( * ) Notice: Subject to any disclaimer, the term of this patent is extended or adjusted under 35 U.S.C. 154(b) by 0 days.

(21) Appl. No.: 19/007,197

(22) Filed: Dec. 31, 2024

Related U.S. Application Data

(63) Continuation-in-part of application No. 18/199,916, filed on May 19, 2023.

(60) Provisional application No. 63/344,518, filed on May 20, 2022.

(51) Int. Cl.
*F16H 9/24* (2006.01)
*F16H 61/662* (2006.01)

(52) U.S. Cl.
CPC ..... *F16H 9/24* (2013.01); *F16H 2061/66295* (2013.01)

(58) Field of Classification Search
CPC .......... B62M 25/08; B62M 9/08; B62M 9/04; F16H 55/54; F16H 9/24; F16H 55/30; F16H 9/10
See application file for complete search history.

(56) References Cited

U.S. PATENT DOCUMENTS

| | | | | | |
|---|---|---|---|---|---|
| 3,798,989 | A | * | 3/1974 | Hunt | F16H 55/30 474/49 |
| 3,800,613 | A | * | 4/1974 | Clark | F16H 9/24 474/54 |

| | | | | | |
|---|---|---|---|---|---|
| 3,913,410 | A | * | 10/1975 | Ackerman | F16H 55/54 474/84 |
| 3,948,112 | A | * | 4/1976 | Gilbert | F16H 61/66245 474/14 |
| 3,995,508 | A | * | 12/1976 | Newell | F16H 35/02 474/50 |
| 4,030,373 | A | * | 6/1977 | Leonard | B62M 9/08 474/49 |
| 4,068,539 | A | * | 1/1978 | Nyc | F16H 9/10 474/50 |
| 4,342,559 | A | * | 8/1982 | Williams | F16H 9/10 474/49 |
| 4,493,678 | A | * | 1/1985 | Husted | B62M 9/08 474/57 |
| 4,498,351 | A | * | 2/1985 | Ahoor | F16H 55/54 474/49 |
| 4,516,960 | A | * | 5/1985 | Rathert | F16H 55/54 474/49 |
| 4,626,228 | A | * | 12/1986 | Kooijman | B62M 3/06 474/49 |
| 4,634,406 | A | * | 1/1987 | Hufschmid | B62M 9/08 474/49 |
| 4,642,070 | A | * | 2/1987 | Walker | B62M 9/08 474/57 |

(Continued)

*Primary Examiner* — Henry Y Liu

(74) *Attorney, Agent, or Firm* — Law Office of Craig Bohn; Craig E. Bohn

(57) ABSTRACT

A system for managing and accommodating variations in the operational interfaces involved in the linkage of segmented gears that expand radially, to include improvements to the mounting and articulation of the segment portions of the gear and subsystems for controlling and ameliorating the effects of linear variations in the plane of rotation and variations in the coordinated changes in the radius of multiple segmented gears in a linkage system with the incorporation of a microprocessor.

9 Claims, 6 Drawing Sheets

(56) References Cited

U.S. PATENT DOCUMENTS

| | | | | |
|---|---|---|---|---|
| 4,645,475 A * | 2/1987 | Husted | B62M 9/08 | |
| | | | 474/49 | |
| 4,705,492 A * | 11/1987 | Hattori | F16H 61/66254 | |
| | | | 474/49 | |
| 4,740,190 A * | 4/1988 | Pike | B62M 9/08 | |
| | | | 474/49 | |
| 4,768,996 A * | 9/1988 | Kumm | F16H 9/10 | |
| | | | 474/49 | |
| 4,772,250 A * | 9/1988 | Kovar | B62M 9/08 | |
| | | | 474/49 | |
| 4,787,879 A * | 11/1988 | Pritchard | B62M 9/08 | |
| | | | 474/49 | |
| 4,810,235 A * | 3/1989 | Husted | B62M 9/08 | |
| | | | 474/49 | |
| 4,816,008 A * | 3/1989 | Leonard | B62M 9/08 | |
| | | | 474/49 | |
| 4,832,660 A * | 5/1989 | Leonard | F16H 55/54 | |
| | | | 474/49 | |
| 4,836,046 A * | 6/1989 | Chappel | B62M 9/08 | |
| | | | 474/57 | |
| 4,878,883 A * | 11/1989 | Wheless | F16H 55/54 | |
| | | | 474/51 | |
| 4,973,289 A * | 11/1990 | Leonard | B62M 9/08 | |
| | | | 474/49 | |
| 5,006,094 A * | 4/1991 | Leonard | F16H 9/10 | |
| | | | 474/49 | |
| 5,011,458 A * | 4/1991 | Kumm | F16H 37/0846 | |
| | | | 477/41 | |
| 5,013,284 A * | 5/1991 | Leonard | B62M 9/08 | |
| | | | 280/214 | |
| 5,041,061 A * | 8/1991 | Leonard | F16H 55/54 | |
| | | | 474/52 | |
| 5,104,357 A * | 4/1992 | Leonard | F16H 55/54 | |
| | | | 474/49 | |
| 5,476,422 A * | 12/1995 | Schendel | B62M 9/08 | |
| | | | 474/49 | |
| 5,492,506 A * | 2/1996 | Lorance | F16H 55/54 | |
| | | | 474/49 | |
| 5,520,583 A * | 5/1996 | Balingit | F16H 55/54 | |
| | | | 474/50 | |
| 5,772,546 A * | 6/1998 | Warszewski | B62M 9/08 | |
| | | | 474/50 | |
| 5,984,814 A * | 11/1999 | Davenport | B62M 9/08 | |
| | | | 474/57 | |
| 6,183,385 B1 * | 2/2001 | Bakulich, Jr. | F16H 55/54 | |
| | | | 474/49 | |
| 6,332,852 B1 * | 12/2001 | Allard | B62M 9/08 | |
| | | | 474/49 | |
| 7,156,764 B2 * | 1/2007 | Mercat | B62M 25/045 | |
| | | | 474/47 | |
| 7,261,655 B2 * | 8/2007 | Vargas | F16H 9/10 | |
| | | | 474/49 | |
| 7,713,154 B2 * | 5/2010 | Hawthorn | F16G 13/06 | |
| | | | 474/85 | |
| 7,955,203 B2 * | 6/2011 | Siman-Tov | F16G 13/02 | |
| | | | 474/155 | |
| 9,447,852 B2 * | 9/2016 | Williams | F16H 9/24 | |
| 9,765,860 B2 * | 9/2017 | Tange | F16H 9/24 | |
| 10,167,055 B2 * | 1/2019 | Magee | B62M 9/08 | |
| 10,766,567 B2 * | 9/2020 | Morin | F16H 9/24 | |
| 10,988,207 B1 * | 4/2021 | Earle | B62M 9/1342 | |
| 10,989,281 B2 * | 4/2021 | Allen | B62M 9/10 | |
| 11,326,671 B2 * | 5/2022 | Van Tilburg | F16H 55/54 | |
| 11,572,131 B2 * | 2/2023 | Allen | B62M 9/14 | |
| 11,572,135 B2 * | 2/2023 | Earle | B62M 9/136 | |
| 11,639,749 B1 * | 5/2023 | Nejah | B62M 25/08 | |
| | | | 474/56 | |
| 11,741,839 B2 * | 8/2023 | Ookuma | G08G 1/005 | |
| | | | 340/993 | |
| 12,060,135 B2 * | 8/2024 | Earle | B62M 25/08 | |
| 12,097,929 B2 * | 9/2024 | Allen | B62M 9/04 | |
| 12,208,861 B2 * | 1/2025 | Shipman | B62M 9/1346 | |
| 12,319,379 B2 * | 6/2025 | Stephens | B62M 6/60 | |
| 2002/0084618 A1 * | 7/2002 | Lerman | B62M 1/36 | |
| | | | 280/281.1 | |
| 2004/0097307 A1 * | 5/2004 | Murray | B62M 9/08 | |
| | | | 474/69 | |
| 2005/0148416 A1 * | 7/2005 | Naude | F16H 55/54 | |
| | | | 474/49 | |
| 2005/0192136 A1 * | 9/2005 | Allard | F16H 55/54 | |
| | | | 474/47 | |
| 2005/0202912 A1 * | 9/2005 | Tay | F16H 63/062 | |
| | | | 474/83 | |
| 2005/0288137 A1 * | 12/2005 | Vargas | F16H 55/54 | |
| | | | 474/49 | |
| 2006/0252589 A1 * | 11/2006 | Tay | F16H 63/067 | |
| | | | 474/49 | |
| 2008/0214345 A1 * | 9/2008 | Khan | F16H 9/24 | |
| | | | 474/231 | |
| 2011/0059821 A1 * | 3/2011 | Lee | F16H 55/56 | |
| | | | 474/8 | |
| 2012/0065858 A1 * | 3/2012 | Nickolaou | B60Q 9/008 | |
| | | | 701/1 | |
| 2012/0238384 A1 * | 9/2012 | Lee | F16H 9/10 | |
| | | | 474/25 | |
| 2015/0251725 A1 * | 9/2015 | Rockwood | F16H 9/24 | |
| | | | 474/56 | |
| 2016/0114858 A1 * | 4/2016 | Magee | B62M 9/08 | |
| | | | 474/49 | |
| 2017/0268896 A1 * | 9/2017 | Bai | G01C 21/3484 | |
| 2017/0283006 A1 * | 10/2017 | Schuster | B62M 9/08 | |
| 2019/0226560 A1 * | 7/2019 | Van Tilburg | F16H 9/24 | |
| 2020/0020234 A1 * | 1/2020 | Cheng | G08G 1/0112 | |
| 2020/0263767 A1 * | 8/2020 | Allen | F16H 55/30 | |
| 2020/0377174 A1 * | 12/2020 | Allen | B62M 9/123 | |
| 2021/0139104 A1 * | 5/2021 | Earle | B62M 9/136 | |
| 2021/0245836 A1 * | 8/2021 | Earle | B62M 25/08 | |
| 2022/0198930 A1 * | 6/2022 | Ookuma | G08G 1/04 | |
| 2022/0382284 A1 * | 12/2022 | Carr | B60Q 9/008 | |
| 2023/0202608 A1 * | 6/2023 | Stephens | G06V 20/58 | |
| | | | 180/206.3 | |
| 2023/0242211 A1 * | 8/2023 | Earle | B62M 9/1342 | |
| | | | 474/80 | |
| 2023/0365221 A1 * | 11/2023 | Allen | B62M 6/55 | |

* cited by examiner

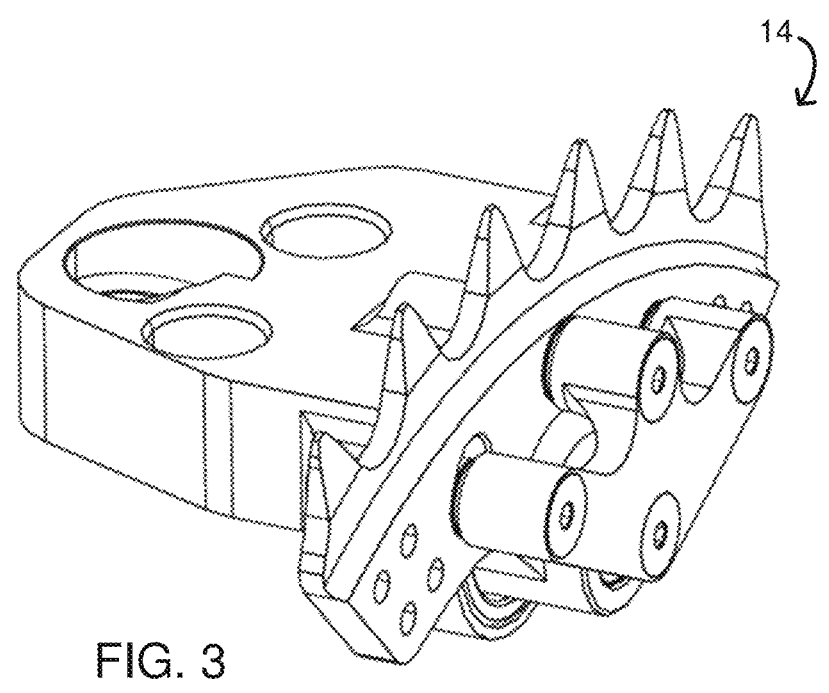
FIG. 3
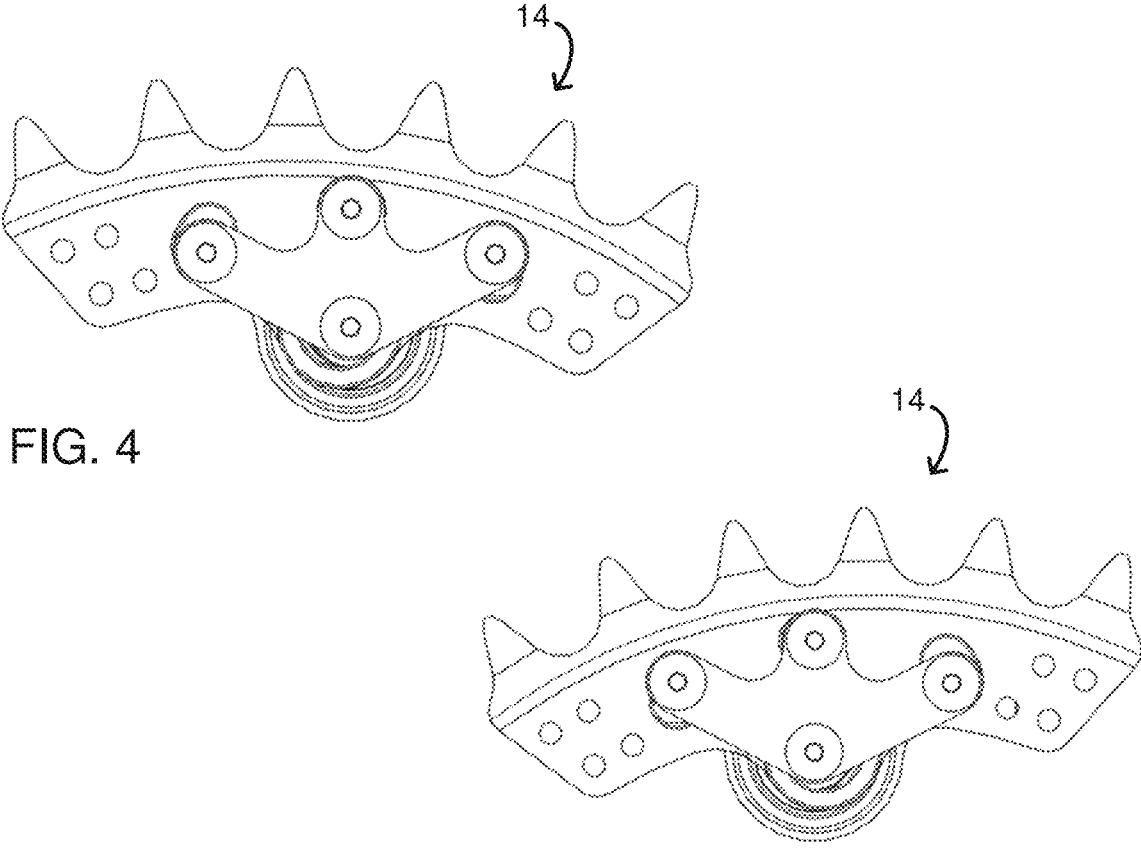
FIG. 4
FIG. 5

SEGMENTED GEAR SYNCHRONIZATION SYSTEM

CROSS-REFERENCE TO RELATED APPLICATIONS

This application claims the benefit of U.S. Provisional Application No. 63/616,755, filed on 31 Dec. 2023, by the present inventor, entitled "Segmented Gear Synchronization System," and U.S. application Ser. No. 18/199,916, filed on 19 May 2023, by the present inventor, entitled "Systems and Methods for Connecting Machines, such as Bikes and Vehicles, with Pedestrians," which claims the benefit of U.S. Provisional Application No. 63/344,518, filed on 20 May 2022, by the present inventor, entitled "Systems and Methods for Connecting Machines, such as Bikes and Vehicles, with Pedestrians," which are all hereby incorporated by reference in their entirety for all allowable purposes, including the incorporation and preservation of any and all rights to patentable subject matter of the inventor, such as features, elements, processes and process steps, improvements, and their descriptions that may supplement or relate to the subject matter described herein.

BACKGROUND OF THE INVENTION

This invention relates generally to an expandable diameter gear set, and more specifically improvements to facilitate reliability and the smooth radial gear engagement of a variable gear circumference.

The following patents describe various adjustable diameter mechanisms, the state of the art, and problems and challenges, to which they offer solutions. U.S. Pat. No. 4,493,678, by Royce H. Husted, filed on Jun. 11, 1982, describes a design entitled Expandable Sprocket. U.S. Pat. No. 4,740,190, by Joseph A. Pike, filed on Jan. 29, 1987, describes a design entitled Variable Ratio Bicycle Chain Drive. U.S. Pat. No. 4,850,939, by Keith C. Chilcote and Robert J. Mahlowski, filed on Oct. 21, 1987, describes a design entitled Variable Diameter Sprocket Assembly. U.S. Pat. No. 4,952,196, by Keith C. Chilcote and Robert J. Mahlowski, filed on Oct. 21, 1987, describes a design also entitled Variable Diameter Sprocket Assembly. U.S. Pat. No. 5,984,814, by Bruce Davenport, filed on Sep. 4, 1997, describes a design entitled Variable Ratio Chain Drive Transmission. Of particular interest is U.S. Pat. No. 11,639, 749, by Allen Nejah and Sagar Bhatia, filed on May 21, 2020, entitled Gear Set, which describes a segmented gear, where the movable segment portions are individually or collectively movable to adjust the diameter, and thereby the circumference. Each of these patents is hereby incorporated by reference in its entirety to provide examples of the state of the art and background of the current invention, challenges perceived by those in the field of art, objectives in creating a more desirable design, and to provide examples of standard terms and nomenclature employed in the field of art.

It would be a valuable addition to the field of art, among other things, to improve the adaptability of the gear segment portions to interface with another gear segment or an endless belt across the full variability of the change in a segmented gear diameter and circumference. It would also be a valuable addition to the field of art to improve the durability of segmented gears configured in a gearbox.

SUMMARY OF THE INVENTION

In an exemplary embodiment, the diameter of a drive gear is configured to expand or reduce to change the gearing ratio, in accordance with the teachings of this disclosure. Known shortcomings of this traditional transmission system, frequently employed in bicycles, prompt efforts to design and develop alternative design approaches incorporating adaptable gear ratios using adjustable gear diameters, which may operate with multiple gears linked by an endless belt or direct contact. This development is not limited to use in the exemplary embodiments but may be useful in other vehicles and equipment, powered by human effort, electrical motors, external or internal combustion engines, or other power sources.

The transmission system described subsequently involves the respective radii of the forward and rear gears to be variable, during which the applied torque from the power source can continue evenly and uninterrupted during these transitions. This means that the radial path of the gear linkage can expand and contract as the gear itself expands and contracts as needed by the operator. With this method, a tension or slack wheel is not utilized, and therefore the jarring effects of a gear change from one radial gear to another are no longer present. This design enhancement over the traditional approaches enables benefits in operator comfort and equipment longevity.

This technology also provides improvements to an infinitely variable sprocket device for use in transmissions wherein the variable ratios obtainable with the device are provided by increasing or decreasing the effective diameter of the drive sprocket. Elements of this disclosure improve the adaptability of the gear segment portions to interface with another gear segment or an endless belt across the full variability of the change in a segmented gear diameter and circumference.

BRIEF DESCRIPTION OF THE DRAWINGS

FIG. 3 is a perspective view isometric illustration of a segmented gear portion adapted with elements of an exemplary gear synchronization system according to the present disclosure.

FIG. 4 is a side view isometric illustration of the segmented gear portion of FIG. 3 in a first angled position.

FIG. 5 is a side view isometric illustration of the segmented gear portion of FIG. 3 in a second angled position.

DESCRIPTION OF THE EXEMPLARY EMBODIMENTS

To assist in understanding this description, a few definitions are provided. One of ordinary skill in the field of art may appreciate that an "endless belt" may include a band, belt, cord, rope, and chain, as well as other structures with a continual surface, typically where the two ends may be securely joined. Applying tension along the length of the structure may result in motion of the structure along its endless length, and with that motion may transfer linear motion through tensioned contact with an adjacent structure, such as a gear.

One of ordinary skill in the field of art may appreciate that a "gear" may refer to both an individual wheel structure, typically having a toothed surface pointing outwardly along the outer circumferential surface, or a specific configuration of a transmission that gives a specific ratio of power input to torque output, created by a particularly sized set of wheels and their connection, which may include direct contact and an endless belt.

One of ordinary skill in the field of art may appreciate that "rotary motion" may be created by the transfer of power through linkage, such as direct contact and an endless belt, to a wheel or shaft turning about an axis.

Figures 1, 2:
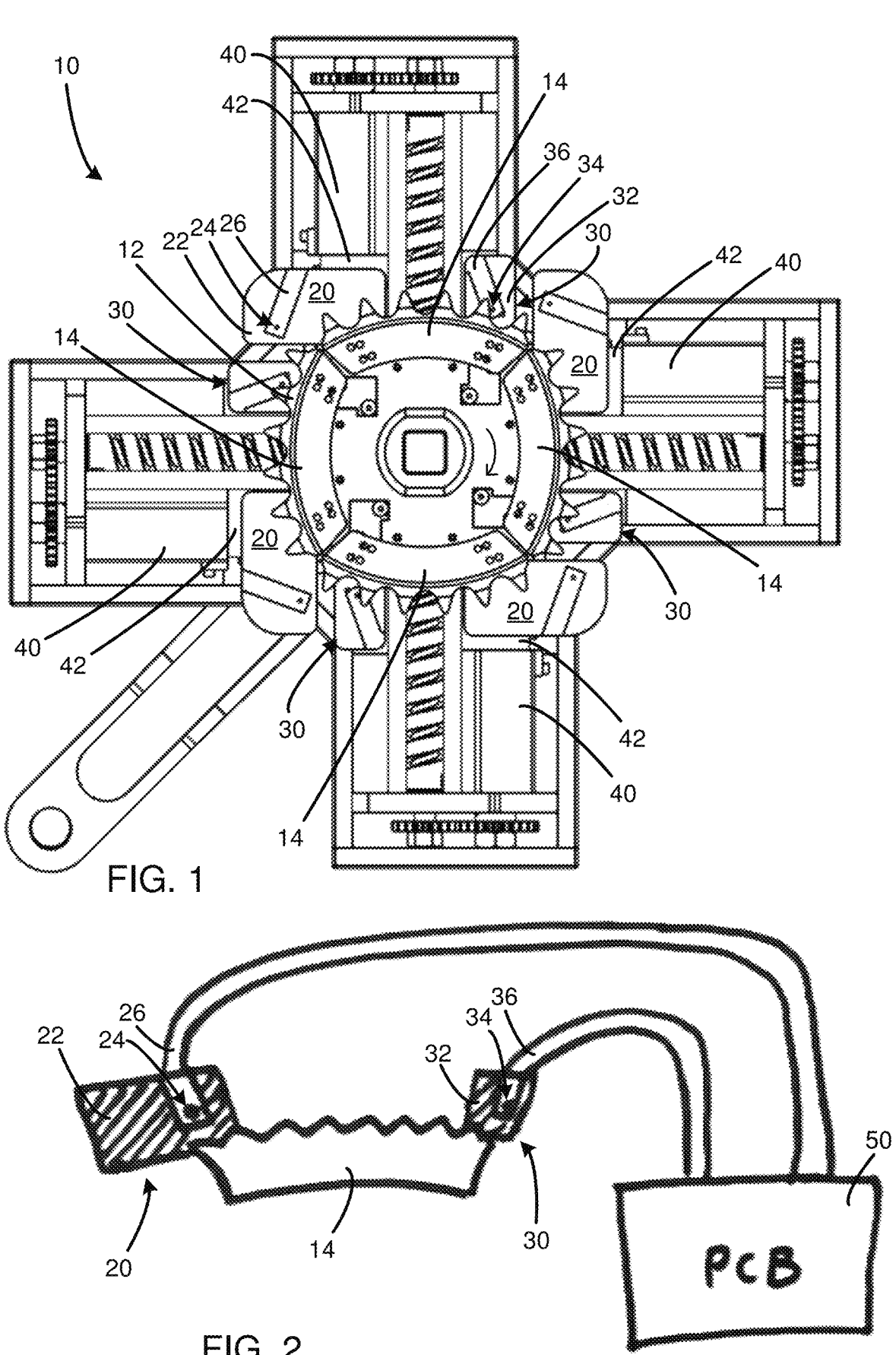
FIG. 1 is an isometric illustration of an exemplary segmented gear in a completely contracted position, adapted with an exemplary gear synchronization system according to the present disclosure.
FIG. 2 is a schematic illustration of an exemplary gear synchronization system interfacing with a segmented gear portion.
Figures 6, 7, 8, 9:
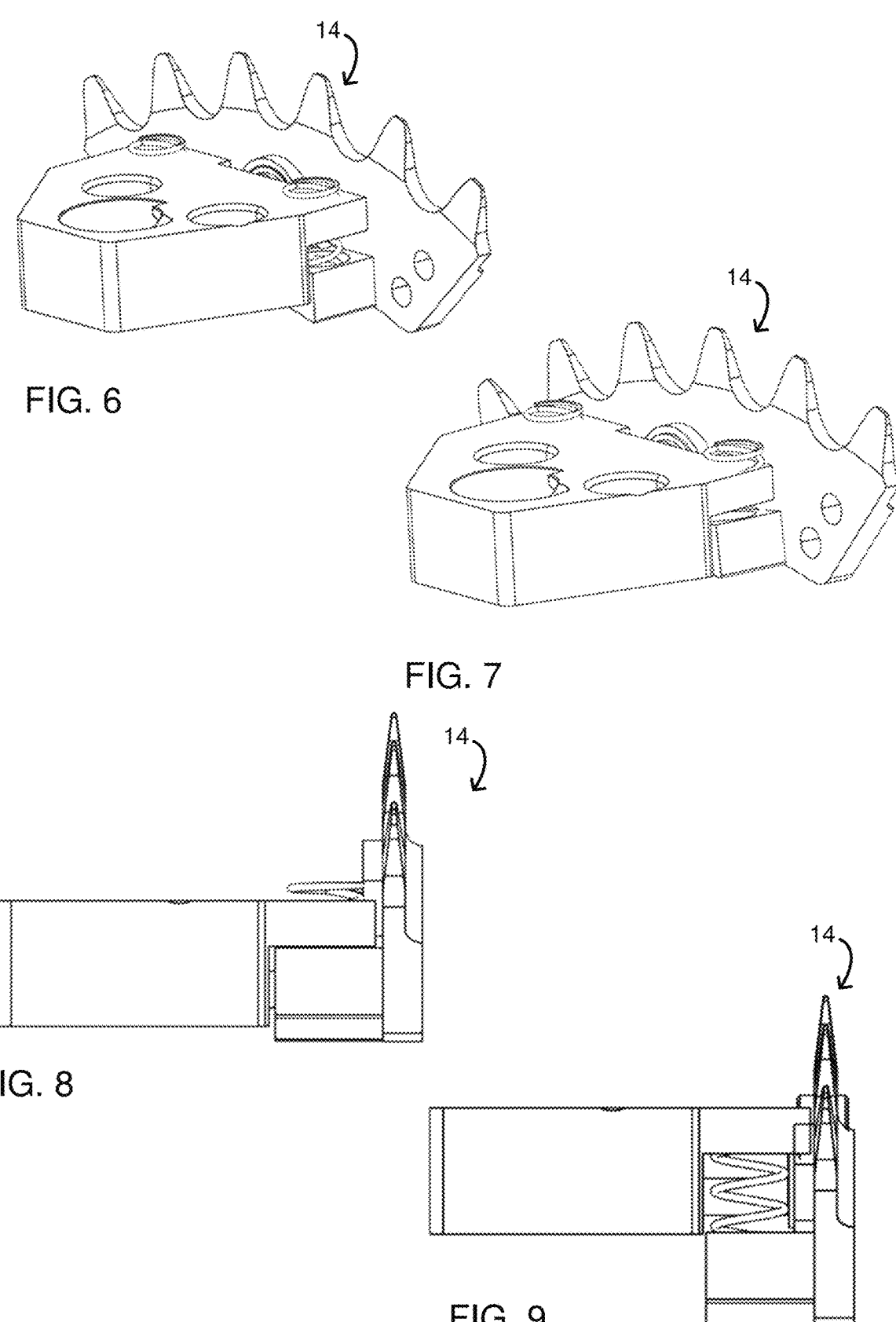
FIG. 6 is a perspective view isometric illustration of a segmented gear portion adapted with elements of an exemplary gear synchronization system according to the present disclosure in a first angled position.
FIG. 7 is a perspective view isometric illustration of the segmented gear portion of FIG. 6 in a second angled position.
FIG. 8 is a perspective view isometric illustration of the segmented gear portion of FIG. 6 in a third angled position.
FIG. 9 is a perspective view isometric illustration of the segmented gear portion of FIG. 6 in a fourth angled position.

Referring now primarily to FIG. 1, in an exemplary embodiment, a gear assembly 10 may have a sprocket 12. In an exemplary embodiment, a sprocket 12 may be segmented, having a plurality of portions 14. In an exemplary embodiment, a sprocket 12 may have four portions 14, which may be referred to as quadrants. As such, an "open quadrant" of the sprocket 12 may exist, which is not engaged with a drive element of the power transfer linkage (simply referred to as the linkage), such as direct contact and an endless belt or chain. Since the quadrant is not involved in the transfer of power, it may be considered "open". In a direct contact system, only one portion 14 may be involved in the linkage at a particular instance, so the other portions 14 may be considered "open quadrants" or "open portions" at that instance. In a single rotation of a sprocket 12, each section of the sprocket may be an "open quadrant" for a period of the rotation.

Expansion of the sprocket 12 presents an issue with the alignment of the adjacent component of the linkage. This alignment issue can be linearly within the plane of rotation and perpendicular to the plane of rotation. In an exemplary embodiment, determining the positioning of the interface may be accomplished by a set of sensors that determine the position of the adjacent linkage component and a leading edge of a portion 14. In an exemplary embodiment, either end of a portion 14 may be the leading edge, since the leading edge depends on the direction of rotation.

Additionally referring to FIG. 2, arbitrarily assigning the direction of rotation of the sprocket 12 in FIG. 1 as clockwise, a pair of proximity sensor assemblies may be positioned with a leading sensor assembly 20 at the leading edge and a trailing sensor assembly 30 at the trailing edge of each portion 14. A proximity sensor is understood to have a sensing distance in which the sensor may sense the presence of an object, which may include a leading edge of a portion 14 or a trailing edge of each portion 14. A pair of sensor assemblies are shown, but fewer or more may be found to be desirable. In an exemplary embodiment, a leading sensor assembly 20 may include a leading sensor frame 22 to secure a leading sensor 24 to the gear assembly 10, as well as a leading sensor lead 26 that operatively connects the leading sensor 24 to a printed circuit board ("PCB") 50. In an exemplary embodiment, a trailing sensor assembly 30 may include a trailing sensor frame 32 to secure a trailing sensor 34 to the gear assembly 10, as well as a trailing sensor lead 36 that operatively connects the trailing sensor 34 to a printed circuit board ("PCB") 50. An appropriate leading sensor 24 and trailing sensor 34 may include a miniature reflective object sensor, QRE113, available from Semiconductor Components Industries, LLC, dba ON Semiconductor.

In an exemplary embodiment, a PCB 50 may include or be operatively connected to a microprocessor, which may control one or more stepper motors 40. A stepper motor 40 may be paired with an encoder 42 to precisely control the operation of the motor 40. In an exemplary embodiment, the operation of the stepper motor 40 controls the expansion motion of a portion 14. An exemplary suitable rotary encoder 42 may include the E4T miniature optical kit encoder, as may be available through US Digital Corporation, of Vancouver, Washington.

Precise expansion of the multiple portions 14 is one manner of eliminating linear variances in the interface with the next component in the linkage. In an exemplary embodiment, the expansion of each portion 14 increases the circumference of the sprocket 12. In an exemplary embodiment, contraction of each portion 14 decreases the circumference of the sprocket 12. Since the circumference is directly connected to the diameter of the sprocket 12, given a stepper motor 40 and encoder 42, the computer-controlled, precise movement of each portion 14 may be in increments that match the distance between links in a chain, ridges in a belt, and other important interface aspects in the next component of the linkage.

In an exemplary embodiment, information from the leading sensor assembly 20 and the trailing sensor assembly 30 provide feedback on the effectiveness of the precise movement of stepper motor 40 as monitored by encoder 42 and controlled by the microprocessor operationally connected to the PCB 50.

Referring now primarily to FIGS. 3 through 11, an assortment of portion assemblies is shown that provide flexibility of motion linearly in the plane of rotation of sprocket 12. Referring now primarily to FIGS. 3 through 5, in an exemplary embodiment, a segmented gear portion 14 may have a first angled position angled away from the assumed clockwise direction of rotation. In an exemplary embodiment, a segmented gear portion 14 may have a second angled position angled toward the assumed clockwise direction of rotation. The travel distance between the first angled position and the second angled position provides for an infinite number of angled positions therebetween to allow for minor movement adjustments linearly in the plane of rotation of the sprocket 12, and increasing the ability to suitably engage with the next linkage component.

Referring now primarily to FIGS. 6 through 9, in an exemplary embodiment, assuming the same relative direction of travel as the prior illustrations, a segmented gear portion 14 may have a first angled position angled slightly toward the assumed direction of rotation. In an exemplary embodiment, a segmented gear portion 14 may have a second angled position angled slightly away from the assumed clockwise direction of rotation. In an exemplary embodiment, a segmented gear portion 14 may have a third angled position angled firmly away from the assumed direction of rotation. In an exemplary embodiment, a segmented gear portion 14 may have a fourth angled position angled firmly toward the assumed clockwise direction of rotation. The travel distance between the position firmly angled away from the direction of travel and the position firmly angled toward the direction of travel provides for an infinite number of angled positions therebetween to allow for minor movement adjustments linearly in the plane of rotation of the sprocket 12, and increasing the ability to suitably engage with the next linkage component.

Figures 10, 11, 12, 13, 14:
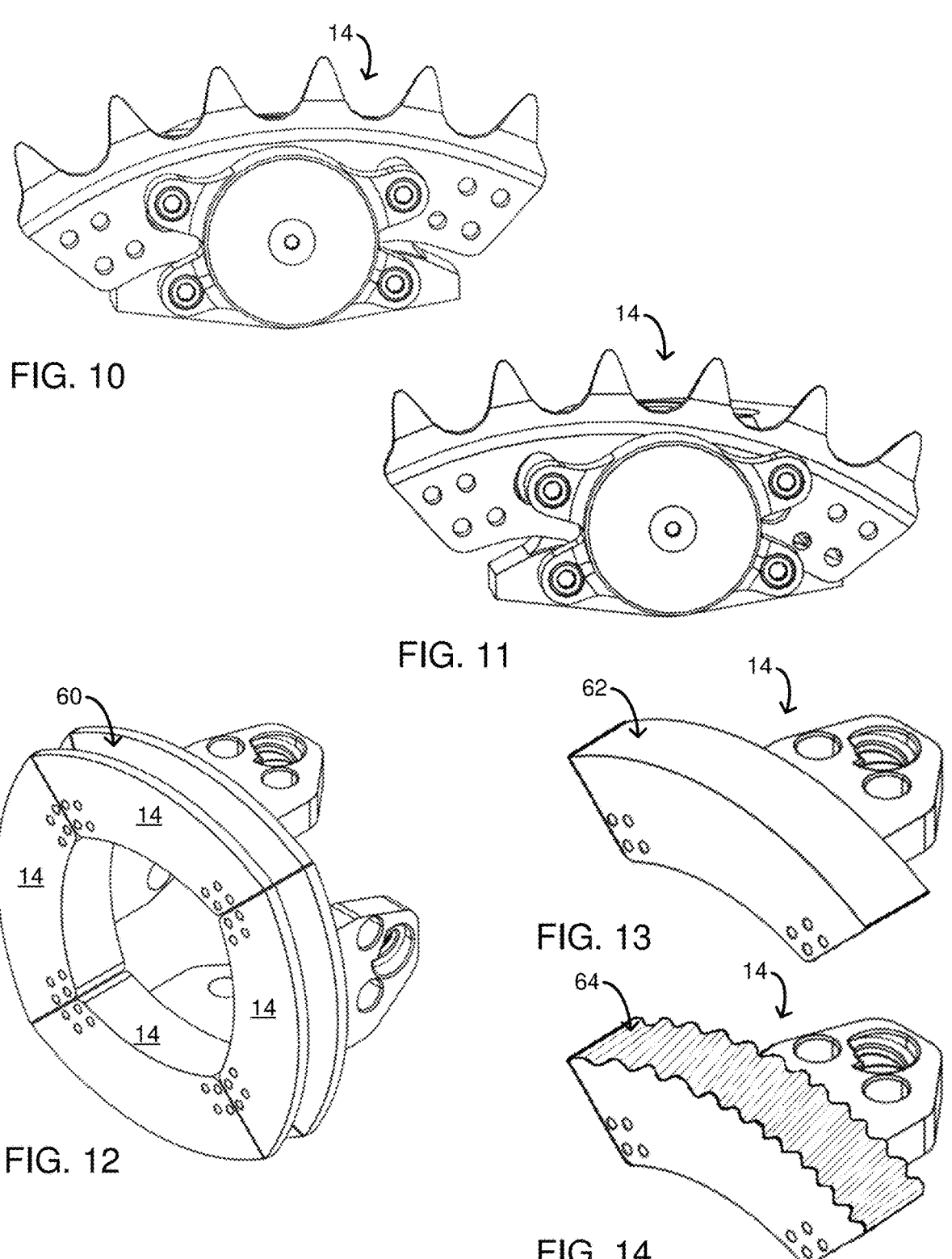
FIG. 10 is a perspective view isometric illustration of a segmented gear portion adapted with elements of an exemplary gear synchronization system according to the present disclosure in a first angled position.
FIG. 11 is a perspective view isometric illustration of the segmented gear portion of FIG. 10 in a second angled position.
FIG. 12 is a perspective view isometric illustration of an exemplary segmented gear in a completely contracted position adapted for a v-belt use in conjunction with an exemplary gear synchronization system according to the present disclosure.
FIG. 13 is a perspective view isometric illustration of an exemplary segmented gear portion adapted for a friction interface use in conjunction with an exemplary gear synchronization system according to the present disclosure.
FIG. 14 is a perspective view isometric illustration of an exemplary segmented gear portion adapted for drive belt use in conjunction with an exemplary gear synchronization system according to the present disclosure.

Referring now primarily to FIGS. 10 and 11, in an exemplary embodiment, a segmented gear portion 14 may have a first angled position angled toward the assumed clockwise direction of rotation. In an exemplary embodiment, a segmented gear portion 14 may have a second angled position angled away from the assumed clockwise direction of rotation. The travel distance between the first angled position and the second angled position provides for an infinite number of angled positions therebetween to allow for minor movement adjustments linearly in the plane of rotation of the sprocket 12, and increasing the ability to suitably engage with the next linkage component.

Referring now primarily to FIGS. 12 through 14, in an exemplary embodiment, a portion 14 may be configured to interface with various forms of linkage components. In FIG. 12, a portion 14 may have an interface 60 designed to accommodate a v-belt. In FIG. 13, a portion 14 may have a direct contact interface 62 designed for direct contact to a linkage component with a similar surface and may be suitable for a smooth endless belt. In FIG. 14, a portion 14 may have a contoured interface 64 to interface with a similarly contoured linkage component, which may be a similar portion 14 on a second sprocket, and may be a similarly contoured endless belt. In an exemplary embodiment, a portion 14 may have an interface that is a combination of those shown, such as a v-belt interface 60 with a contoured interface 64 intermediate the groove sides.

Figures 15, 16, 17:
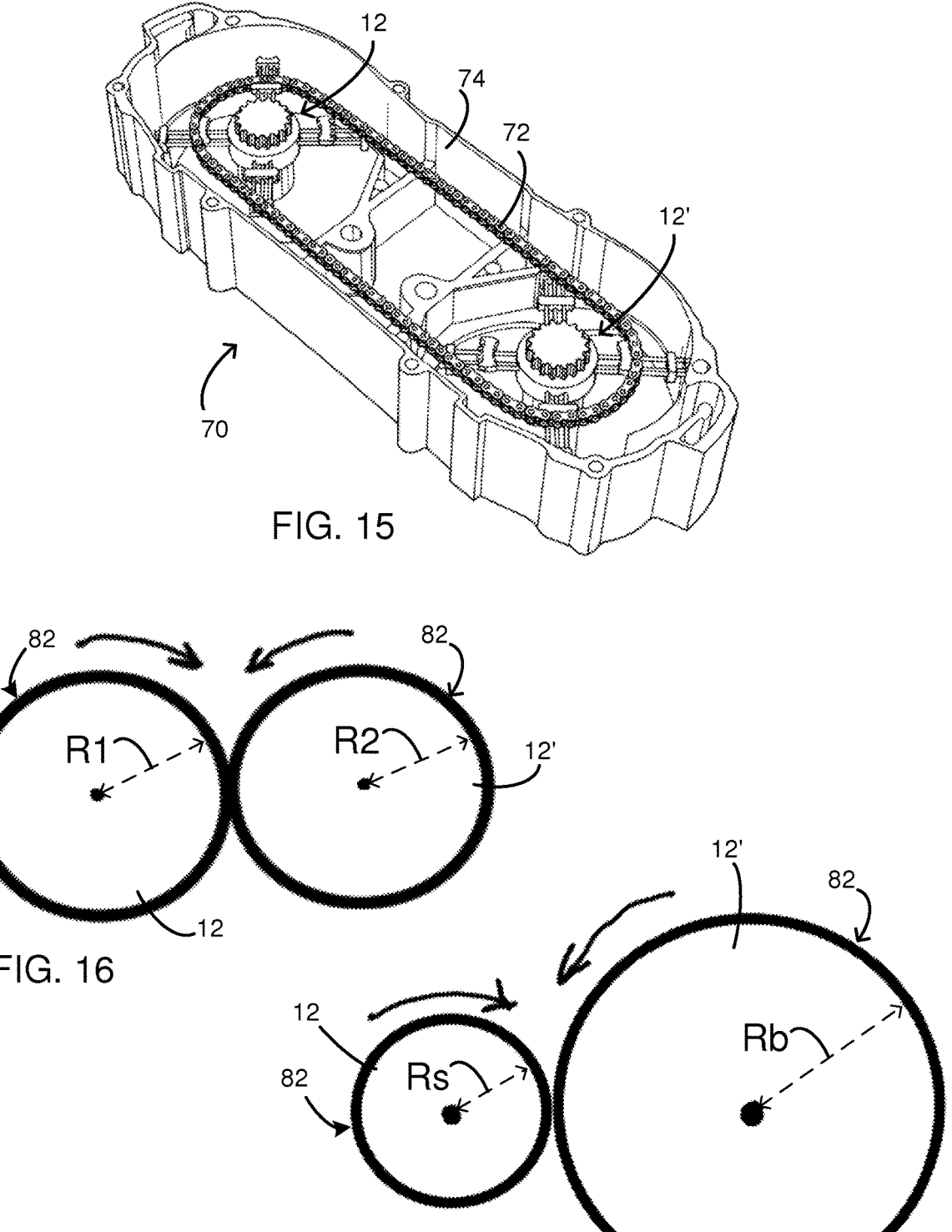
FIG. 15 is a perspective depiction of an exemplary gearbox employing multiple segmented gears, enabled by an exemplary gear synchronization system according to the present disclosure.
FIGS. 16 and 17 are schematic illustrations of an exemplary gear shift of an exemplary gearbox employing multiple segmented gears in direct contact, enabled by an exemplary gear synchronization system according to the present disclosure.

Referring now primarily to FIGS. 15 through 19, a variety of linkage configurations are shown that may employ components of the current improvements to provide more reliable operation. Referring now to FIG. 15, a linkage assembly 70, comprised of multiple sprockets 12 operationally connected by an endless belt 72 in the form of a drive chain, may be configured within a housing 74. In an exemplary embodiment, an endless belt 72 may have a length, the length being a set length adequate for the endless belt 72 to engage and link the outer circumference of sprocket 12 and sprocket 12' with an acceptable amount of tension. In an exemplary embodiment, linkage assembly 70 may employ one or more components to provide linear variability in the plane of rotation in the interface between linkage components, such as between one sprocket 12 and the endless belt 72.

Referring now primarily to FIGS. 16 and 17, a linkage assembly 80 may include multiple sprockets 12. In an exemplary embodiment, a first sprocket 12 may make direct contact with a second sprocket 12'. The first sprocket 12 may receive rotational force from an external source and impart that force to the second sprocket 12' through the linkage of direct contact between their circumferential surfaces 82. The first sprocket 12 may have a radius of R1 and the second sprocket 12 may have a radius of R2. In an exemplary embodiment, R1 may be equal to R2, and the first sprocket 12 may rotate at the same speed, with the same power, as the second sprocket 12'. In an exemplary embodiment, to maintain linkage through direct contact, a decrease in radius R1 to a smaller radius Rs must be precisely coordinated with an increase in radius R2 to a bigger radius Rb. In an exemplary embodiment, R1 plus R2 must be close to the same distance as Rs plus Rb. The variations may be accommodated by monitoring and adjustment of the position of the various portions 14 through the system of sensor assemblies (20, 30) operatively connected to the PCB, as described herein.

Figures 18, 19:
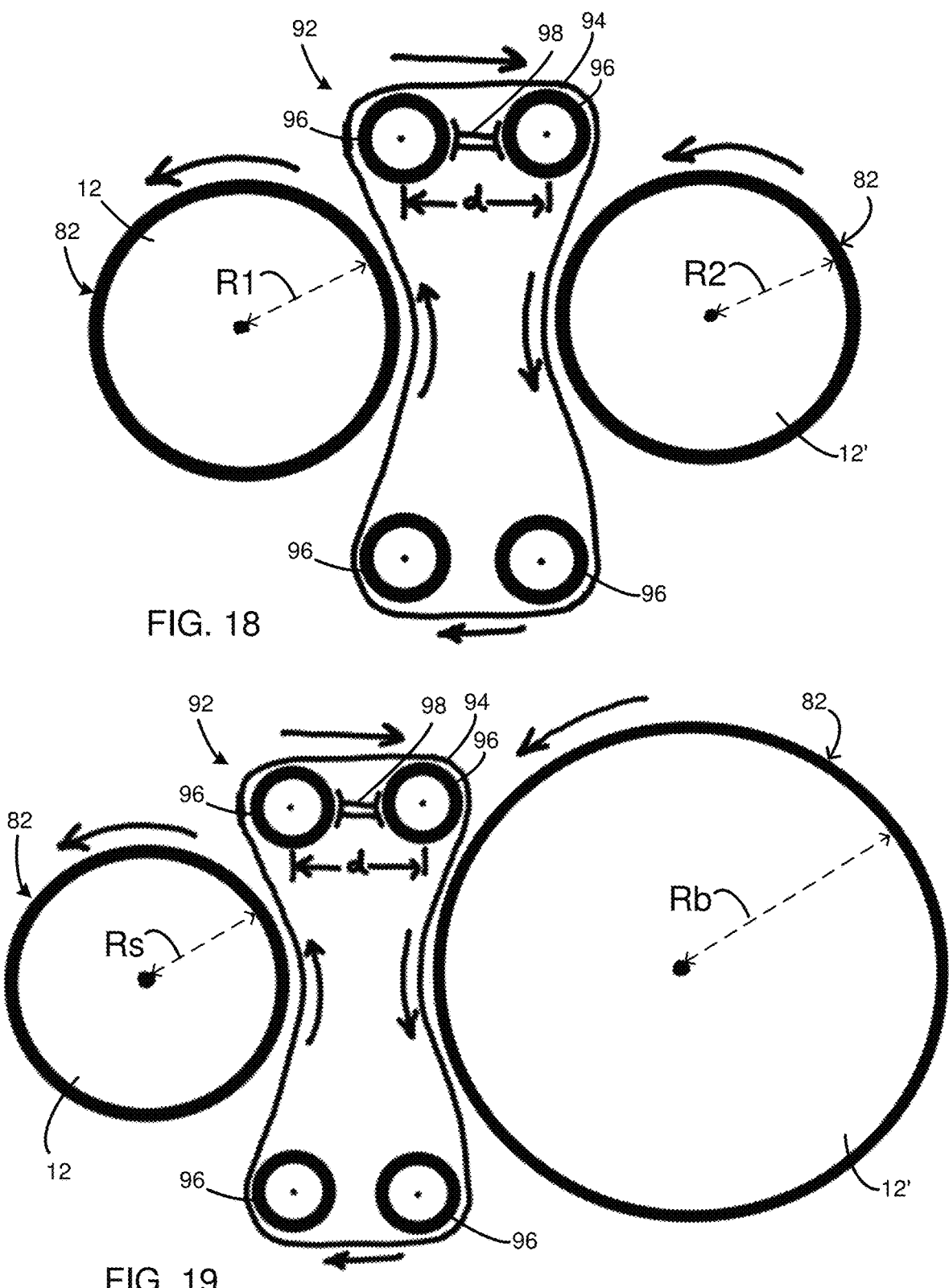
FIGS. 18 and 19 are schematic illustrations of an exemplary gear shift of an exemplary gearbox employing multiple segmented gears operatively connected by a buffer belt system, enabled by an exemplary gear synchronization system according to the present disclosure.

Referring now primarily to FIGS. 18 and 19, a linkage assembly 90 may include multiple sprockets 12. In an exemplary embodiment, a first sprocket 12 may make direct contact with a second sprocket 12'. The first sprocket 12 may receive rotational force from an external source and impart that force to the second sprocket 12' through the linkage of a buffer assembly 92 between their circumferential surfaces 82. The first sprocket 12 may have a radius of R1 and the second sprocket 12 may have a radius of R2. In an exemplary embodiment, R1 may be equal to R2 and the first sprocket 12 may rotate at the same speed, with the same power, as the second sprocket 12'. In an exemplary embodiment, intermediate first sprocket 12 and second sprocket 12' may be a buffer assembly 92 positioned in the rotational plane of first sprocket 12 and second sprocket 12'. In an exemplary embodiment, buffer assembly 92 may comprise an endless belt 94 engaged around a plurality of rollers 96. In an exemplary embodiment, a pair of rollers 96 may be positioned on one side of a line between the two axes of first sprocket 12 and second sprocket 12', and another pair of rollers 96 may be positioned opposite the line between the two axes of first sprocket 12 and second sprocket 12'. In an exemplary embodiment, at least one pair of rollers are positioned an adjustable distance d apart, with a spreader 98 operatively adjusting the length of distance d.

In an exemplary embodiment, to maintain linkage through buffer assembly 92, a decrease in radius R1 to a smaller radius Rs must be coordinated with an increase in radius R2 to a bigger radius Rb. In an exemplary embodiment, R1 plus R2 must be close to the same distance as Rs plus Rb. The variations may be accommodated by the spreader 98 with precise and controlled increases and decreases in distance d. In an exemplary embodiment, spreader 98 is operatively connected to a microprocessor and the PCB 50, and the microprocessor may coordinate and control the multiple systems and components included in the sensor assemblies (20, 30), the sprockets (12, 12'), and the buffer assembly 92.

The examples contained in this specification are merely possible implementations of the current system, and alternatives to the particular features, elements and process steps, including scope and sequence of the steps may be changed without departing from the spirit of the invention. The present invention should only be limited by the examined and allowed claims, and their legal equivalents, since the provided exemplary embodiments are only examples of how the invention may be employed, and are not exhaustive.

I claim:

1. A system, comprising:
a gear having a plurality of movable portions that are individually or collectively movable to adjust a dimension or a shape of the gear, each portion having a leading edge and a trailing edge;
a microprocessor programmable to control the position of the plurality of movable portions;
a sensor positioned within sensing distance of a first movable portion;
the sensor operatively connected to the microprocessor to provide position information of the first movable portion; and
the microprocessor programmable to use the position information to adjust the position of the first movable portion.

2. The system of claim 1, further comprising:
the sensor positioned within sensing distance of the leading edge of the first movable portion.

3. The system of claim 1, further comprising:
the sensor positioned within sensing distance of the trailing edge of the first movable portion.

4. The system of claim 1, further comprising:
the sensor positioned within sensing distance of the leading edge of the first movable portion and a second sensor positioned within sensing distance of the trailing edge of the first movable portion.

5. A system, comprising:
a first gear and a second gear, each having a plurality of movable portions that are individually or collectively movable to adjust a dimension or a shape of their gear, each portion having a leading edge and a trailing edge;
a microprocessor programmable to control the position of the plurality of movable portions;
one of the plurality of sensors positioned within sensing distance of each of the movable portions;
the plurality of sensors operatively connected to the microprocessor to provide position information of each of the movable portions; and
the microprocessor programmable to use the position information to adjust the position of each of the movable portions.

6. The system of claim 5, further comprising:
one of the plurality of sensors positioned within sensing distance of the leading edge of the movable portion of the first gear and another of the plurality of sensors positioned within sensing distance of the leading edge of the movable portion of the second gear.

7. The system of claim 5, further comprising:
one of the plurality of sensors positioned within sensing distance of the trailing edge of the movable portion of the first gear and another of the plurality of sensors positioned within sensing distance of the trailing edge of the movable portion of the second gear.

8. The system of claim 7, further comprising:
one of the plurality of sensors positioned within sensing distance of the trailing edge of the movable portion of the first gear and another of the plurality of sensors positioned within sensing distance of the trailing edge of the movable portion of the second gear.

9. The system of claim 5, further comprising:
an endless belt having a set length; and
the microprocessor configured to adjust the position of the movable portions to maintain an acceptable tension in the endless belt.

* * * * *